Sept. 14, 1937.   G. GROSKRITZ   2,092,841
INTERNAL COMBUSTION ENGINE
Filed Aug. 21, 1933   3 Sheets-Sheet 1
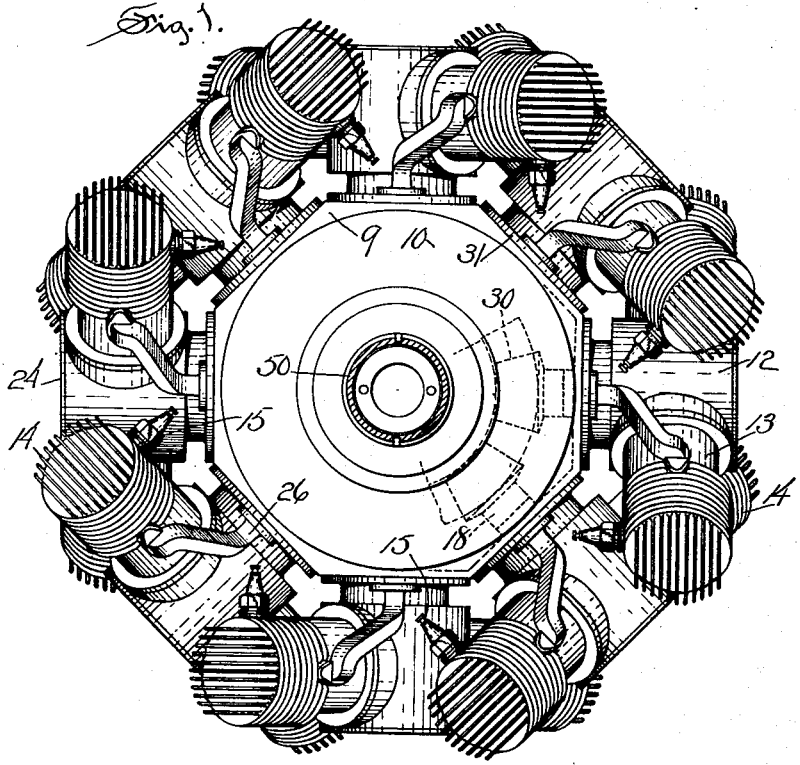
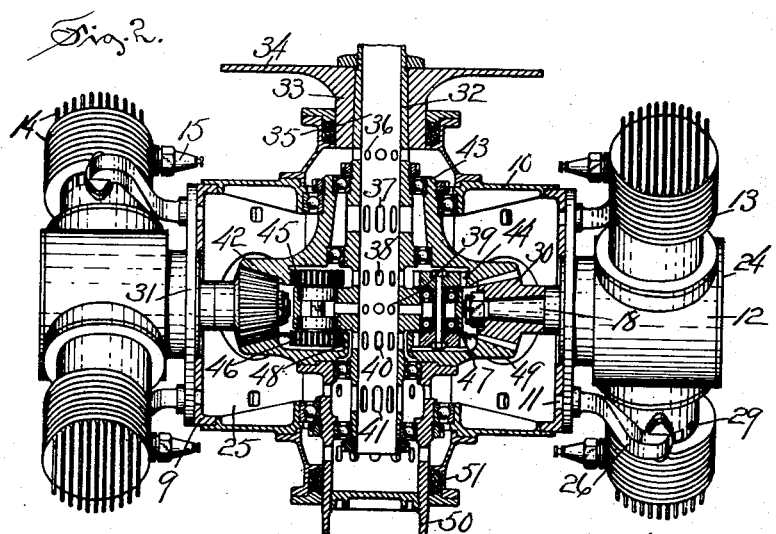
INVENTOR
George Groskritz
by
Arthur P. Jenkins
ATTORNEY Sept. 14, 1937.　　　　G. GROSKRITZ　　　　2,092,841
INTERNAL COMBUSTION ENGINE
Filed Aug. 21, 1933　　　3 Sheets-Sheet 2
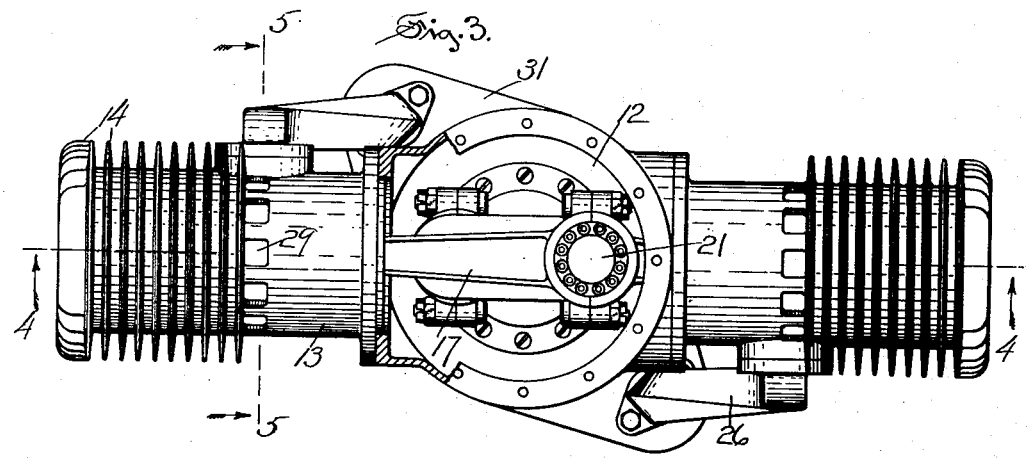
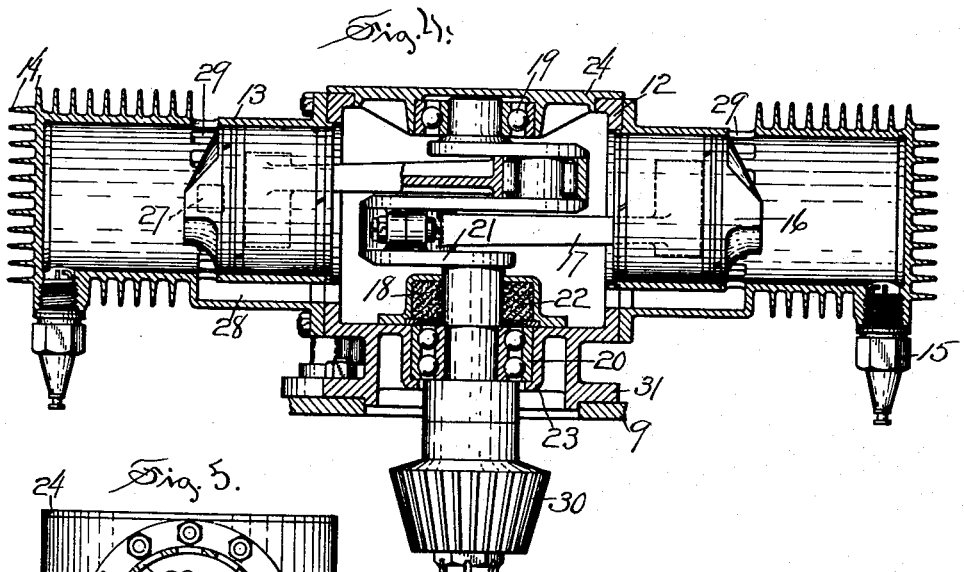
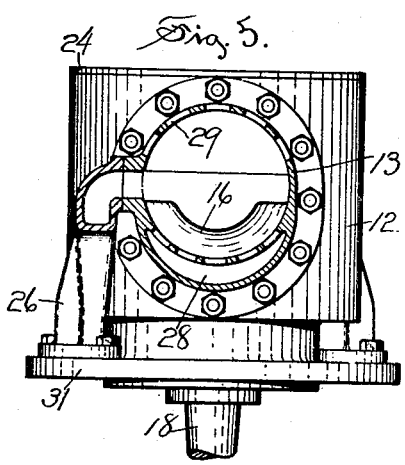
INVENTOR
George Groskritz.
by
Arthur B. Jenkins.
ATTORNEY

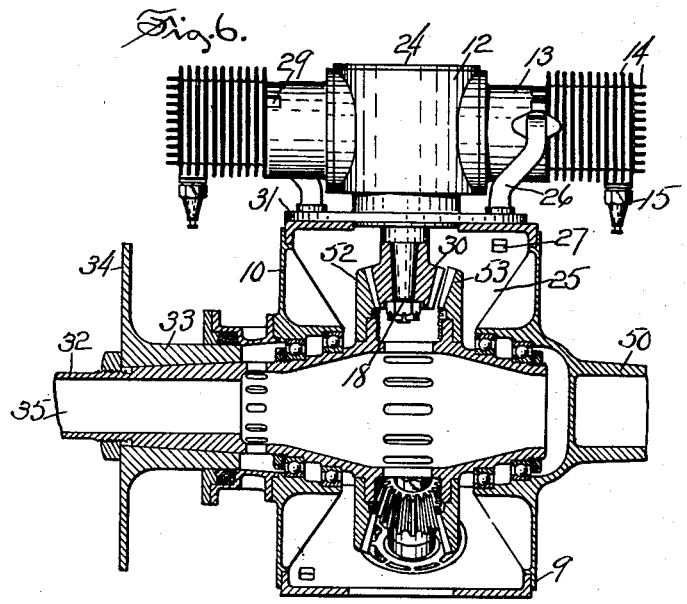
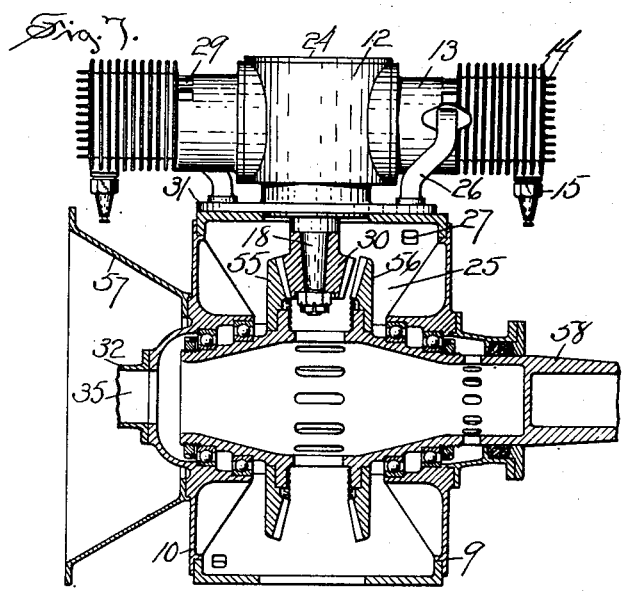

Patented Sept. 14, 1937

2,092,841

UNITED STATES PATENT OFFICE 2,092,841

INTERNAL COMBUSTION ENGINE

George Groskritz, Hartford, Conn.

Application August 21, 1933, Serial No. 686,063

7 Claims. (Cl. 74—300)

My invention relates to that class of engines in which a combustible mixture is ignited within the cylinders comprised in the engine structure, and an object of my invention, among others, is the production of an engine of this type that shall be simple in construction and particularly efficient in operation.

One form of an engine embodying my invention and in the construction and use of which the objects herein set out, as well as others, may be attained, is illustrated in the accompanying drawings in which—

Figure 1 is an end view of my improved engine.

Figure 2 is a view in central longitudinal section through the base, the cylinder structures being shown in full.

Figure 3 is a detail view, scale enlarged, of one of the power plants.

Figure 4 is a view in section on a plane denoted by the dotted line 4—4 of Fig. 3.

Figure 5 is a view in section on a plane denoted by the dotted line 5—5 of Fig. 3.

Figure 6 is a view similar to Fig. 2 but illustrating a modified form of construction, a single power plant only being shown.

Figure 7 is a view similar to Figure 6 but illustrating another modified form of construction.

My improved mechanism comprises a plurality of power plants concentrically arranged with respect to a driving shaft, said plants being secured to opposite sides of a supporting case through the center of which the driving shaft extends. Each power plant comprises a pair of cylinders projecting from opposite sides of a crank case the latter being secured to a side of the supporting case and the latter containing the driven mechanism together with a connection of improved form between the driving mechanism, comprising the power plants and the driving mechanism. All of the power plants are of the same construction and the connecting mechanisms between the power plants and the driving mechanism are all of the same construction and for this reason a description of one power plant and of the connecting mechanism appurtenant thereto only will be made herein, it being understood that the description applies equally to all of the power plants and the connecting mechanisms.

In the accompanying drawings the numeral 9 denotes a supporting case which is of polygonal form, that herein shown having eight sides to each of which a power plant is secured, but it will be understood that such case may have as many sides with as many power plants as may be desired secured thereto. Heads 10 are secured to opposite sides of the supporting case and ports 11 open therefrom for supply of a combustible mixture to the power plants.

Each power plant includes a crank case 12, preferably round in shape in cross section, and having cylinders 13 projecting from opposite sides thereof, in the structure herein shown there being a single pair of cylinders appurtenant to each power plant, but such other number of cylinders for each plant may be employed as may be desired. Each cylinder may be of ordinary construction with radiating fins 14 extending around the sides and projecting from the heads, and with spark plugs 15 entered into one side near the end thereof. The pistons 16 within the cylinders may be of any ordinary and well-known construction and each is connected by a piston rod 17 with a crank shaft 18 located within the crank case 12 and arranged in any suitable manner, as upon ball bearings 19—20 disposed at opposite sides of the cranks 21, a stuffing box arrangement 22 being located inside the case adjacent to the ball bearing 20. A hub 23 is formed at one end of each cylinder, preferably integral therewith and having an opening through which the crank shaft extends, and a cover plate 24 closes the opposite end of each crank case.

The chamber 25 within the supporting case is a fuel supply chamber from which the combustible fluid properly mixed is delivered through the ports 11 and through passages in conduits 26 to inlet ports 27 in the cylinders for the supply of combustible fluid to the compression chambers within the crank cases. After compression in the crank case of each power plant the combustible fluid is delivered through passages 28 to the combustion chambers within the cylinders in a manner common to two-cycle engines.

Each of the power plants comprises a pair of two-cycle engines, the compression for each cylinder taking place in the crank case 12, and this constitutes an important feature of my invention, as a single crank and compression case is provided for each power plant, all being supplied from a central supply as the chamber 25. Each cylinder is provided with a plurality of exhaust ports 29 opening through the side wall thereof in a manner common to this type of engine.

Each crank shaft 18 has a beveled pinion 30 secured to its end within the crank case, said pinion being located within the chamber 25. Each power plant is secured to the supporting case as by means of screw bolts extending through a flange 31, and it will be noted from this construction that any of the plants may be readily removed when required and a new plant substituted therefor.

The case 9 is supported by a tubular shaft 32 rotatably mounted in a hub 33 projecting from a supporting plate 34 which is adapted to be secured to a rigid part of a vehicle to be driven by the engine, as to the fuselage of an aeroplane the base of an outboard motor, or other structure. The inlet passage 35 through the shaft 32 is for the supply of the combusible mixture to the chamber 25, said mixture also having a lubricating material, as oil, mixed therewith. Ports 36—37—38—39—40 and 41 open from the passage 35 for the supply of the mixture for both lubrication and combustion purposes, the ports 36—37 and 41 delivering the mixture to sets of ball bearings which support the shaft 32, and the ports 38—39 and 40 delivering the mixture to ball bearings and gears constituting a connecting unit between each of the power plants and the driven mechanism hereinbefore referred to, all of the mixture, after passing through the spaces in the ball bearings, gears, etc., eventually finding its way into the chamber 25 from which it is supplied, as hereinbefore described, to the power plants.

The pinion 30 of each power plant meshes with a bevel gear 42 having a hub 43 supported at each end by a set of ball bearings, as shown in Fig. 2 of the drawings. The gear 42 has an internal set of gear teeth 44 meshing with a pinion 45 constituting one of a pair of pinions 45—46 which are mounted in ball bearings in an annular flange 47 extending around the tubular shaft 32. The pinion 46 of said pair meshes with a gear 48 internally formed on the hub of a bevel gear 49 secured to a driven shaft 50 extending outwardly through the case 9 and supported by ball bearings therein and also by ball bearings on the end of the shaft 32. A stuffing box 51 is arranged on the case through which the shaft 50 extends, and the latter may support a propeller or other device to be driven by the shaft 50.

In the operation of the structure thus far described the gears 44 and 48 in mesh with the two pairs of pinions 45 and 46 which are of the same size, owing to the difference in pitch diameter between the teeth of said gears, have a tendency to drive said gears at different rates of speed, and the pinions being secured together and being mounted in the flange 47 of the stationary shaft 32, this difference in force is transmitted to the case 9 which is caused to rotate, thereby rotating the shaft 50 to which a propeller or similar device is secured. This enables the shaft 50 to be driven at such rate of speed as compared with the speed of rotation of the case 9 as may be desired, simply by changing the sizes of the intermeshing pinions and gears. It is usually desired that the shaft 50 shall rotate at a much greater rate of speed than that at which the case 9 rotates.

The structure shown in Fig. 6 is the same as that hereinbefore described with minor differences which reside in the bevel pinions 30 of several engine units meshing some with the gear 52 and others with the gear 53. The gears 52 and 53 are held against rotation, being secured to the shaft 32, thereby constituting said gears as racks. The pairs of pinions 45 and 46 are omitted in the structure of Fig. 6.

The power plants are alternately driven in opposite directions with a result that the pinions 30 travel around the gears 52 and 53, carrying with them the case 9 and thereby driving the shaft 50 and the device, as a propeller, secured thereto.

The structure shown in Fig. 7 is similar to that shown in Fig. 6 in so far as the gears 55 and 56 are meshed with one or the other of the pinions 30 of the power plants. In this structure the case 9 is secured to a stationary support 57 which may be the fuselage of an aeroplane or a stationary part of any other vehicle. The driven shaft 58 in this structure is rotatably mounted in the case 9 instead of being secured thereto as in the previously described structures, and the gears 55 and 56 are secured to said shaft. The plants are driven alternately in opposite directions as in the structure of Fig. 6 with a result that the rotation of the pinions 30 drives the shaft 58 independently of the supporting case 9.

It will be noted that the cylinders of the power plants overlap one another, being inclined with respect to their plane of rotation to accomplish this purpose. This also creates spaces between the overlapped parts which spaces are inclined backwardly thereby increasing the flow of air in a rearward direction, and thereby greatly aiding in the cooling features of the engine.

I claim:

1. A driving mechanism including a supporting shaft, a case rotatably mounted on said shaft and having a chamber, a driven shaft telescoping over and rotatably supported by said supporting shaft and within said case, a system of anti-friction bearings located between the inner wall of said supporting shaft and the outer surface of said driven shaft, a driving connection between said case and said driven shaft, said connection also affording an operative connection between said case and said supporting shaft, and means for rotating said case.

2. A driving mechanism including a supporting shaft, a supporting case relatively rotatably mounted upon said supporting shaft, a driven shaft telescoping over and rotatably supported by said supporting shaft, anti-friction bearings located between the inner wall of said supporting shaft and the outer surface of said shaft in a chamber in said case, a driving connection between said case and said driven shaft and including part of an operative connection between said case and said supporting shaft, and means for rotating said case.

3. A driving mechanism including a supporting shaft open at its outer end, a supporting case having a chamber within which said supporting shaft extends, a driven shaft rotatably mounted on said supporting shaft which projects into the open end of said driven shaft, anti-friction bearings located in said chamber between the inner wall of said supporting shaft and the outer surface of said shaft, a driving connection between said case and said driven shaft and including part of an operative connection between said case and said supporting shaft, and means for rotating said case.

4. A driving mechanism including a supporting shaft, a supporting case having a chamber, gears spaced apart and rotatably mounted on said supporting shaft, rigidly connecting pinions meshing with teeth on each of said gears, driving pinions located in the spaces between said gears and meshed with teeth on the face of each of said gears, and means for rotating said driving pinions.

5. A driving mechanism including a supporting shaft, a supporting case having a chamber, facing gears spaced apart and rotatably mounted on said supporting shaft, said gears having rows of internal and external gear teeth located at different distances from the axis thereof, rigidly connecting pinions meshing with said internal and external gear teeth on said facing gears, one of which is secured to the driven shaft, a driving pinion rotatably mounted in said case between and meshing with the teeth on the faces of said facing gears, and means for rotating said driving pinion.

6. A driving mechanism including a supporting shaft, a supporting case having a chamber, a gear rotatably mounted on said supporting shaft and having a row of internal teeth, a second gear rotatably mounted on said shaft and having a row of external teeth located at a different distance from the axis than the teeth on the first mentioned gear, a driven shaft rotatably mounted on said supporting shaft and secured to said second gear, a set of pinions meshing with said internal and external teeth on both of said gears, a driving pinion rotatably mounted in said case between and meshing with the teeth on the faces of said gears, and means for rotating said driving pinion.

7. A driving mechanism including a supporting shaft, a supporting case having a chamber, a flange projecting from said supporting shaft, a set of pinions mounted in said flange, a gear rotatably mounted on said supporting shaft and having an internal row of teeth meshing with said pinions, a second gear rotatably mounted on said shaft and having a set of teeth meshing with said pinions, a driven shaft secured to said second gear, a driving pinion rotatably mounted in said case and between and meshing with the teeth on the faces of said gears, and means for rotating said driving pinion.

GEORGE GROSKRITZ.